United States Patent
Fitzgerald

(10) Patent No.: US 9,242,736 B2
(45) Date of Patent: Jan. 26, 2016

(54) THREE-RING PARACHUTE CANOPY RELEASE

(71) Applicant: Adam J Fitzgerald, East Hartford, CT (US)

(72) Inventor: Adam J Fitzgerald, East Hartford, CT (US)

(73) Assignee: Capewell Aerial Systems LLC, Cleveland, OH (US)

(*) Notice: Subject to any disclaimer, the term of this patent is extended or adjusted under 35 U.S.C. 154(b) by 349 days.

(21) Appl. No.: 13/734,237

(22) Filed: Jan. 4, 2013

(65) Prior Publication Data

US 2013/0175399 A1 Jul. 11, 2013

Related U.S. Application Data

(60) Provisional application No. 61/583,741, filed on Jan. 6, 2012.

(51) Int. Cl.
*B64D 17/38* (2006.01)
*B64D 17/32* (2006.01)

(52) U.S. Cl.
CPC .............. *B64D 17/32* (2013.01); *B64D 17/38* (2013.01)

(58) Field of Classification Search
CPC ....................................................... B64D 17/38
USPC ................................ 244/151 A, 151 B, 151 R
See application file for complete search history.

(56) References Cited

U.S. PATENT DOCUMENTS

| 2,845,241 | A | * | 7/1958 | Samms | 244/148 |
| 3,120,365 | A | * | 2/1964 | Gutacker | 244/149 |
| 3,237,265 | A | * | 3/1966 | Florian | 24/602 |
| 4,337,913 | A | * | 7/1982 | Booth | 244/151 B |
| 4,746,084 | A |   | 5/1988 | Strong | |
| 4,923,150 | A | * | 5/1990 | Calkins et al. | 244/151 B |
| 6,056,242 | A | * | 5/2000 | Collins | 244/151 B |
| 6,983,913 | B2 |  | 1/2006 | Auvray | |
| 2010/0001140 | A1 | * | 1/2010 | McHugh et al. | 244/148 |

OTHER PUBLICATIONS

Search Report.

* cited by examiner

*Primary Examiner* — Brian M O'Hara
*Assistant Examiner* — Keith L Dixon
(74) *Attorney, Agent, or Firm* — Alix, Yale & Ristas, LLP

(57) ABSTRACT

A parachute canopy release comprising a harness strap and a parachute riser. The parachute riser has a terminal end connected to a riser ring. The harness strap has a connector assembly comprising a ring assembly and a latch assembly. The ring assembly has a middle ring and a small ring secured to the harness strap at middle and small ring securing straps, respectively. The latch assembly has a base and a latch slide engaging the base. The middle ring is inserted through an inner diameter of the riser ring, the small ring is inserted through an inner diameter of the middle ring, and the latch slide is manipulated such that the small ring is retained intermediate said base and an interior surface of said latch slide when said parachute riser is releasably connected to said harness strap.

14 Claims, 2 Drawing Sheets

THREE-RING PARACHUTE CANOPY RELEASE

BACKGROUND

This disclosure is directed to an apparatus for releasably joining two lengths of material such as webbing. More particularly, the disclosure is directed to an apparatus for connecting and releasing a parachute canopy from a parachutist's harness strap.

Two-action parachute canopy release configurations are generally easier to rig than the tab and grommet configuration of conventional three-ring parachute canopy releases. Despite their easy assembly, two-action configurations may require considerable strength to release in extreme conditions. The conventional three-ring configuration uses a high mechanical advantage to reduce operating loads and thereby gain a weight advantage over two-action configurations. Since two-action configurations inherently lack the strong retention capabilities of the conventional three-ring configuration, parachute canopy release mechanisms employing the two-action configuration are heavier as they must be made of high strength steel to provide the requisite structural integrity.

SUMMARY

The three-ring parachute canopy release disclosed herein generally comprises a harness strap, a parachute riser, and a connector assembly. The parachute riser is connected at one end to the parachute canopy, and at the other end the riser terminates in a riser ring. The connector assembly is attached to the harness strap and comprises a ring assembly having a middle ring, a small ring, and securing straps attaching the middle ring and the small ring to the harness strap. The middle ring is sized to be receivable within the inner diameter of the riser ring. Similarly, the small ring is sized to be receivable within the inner diameter of the middle ring.

Additionally, the connector assembly comprises a latch assembly which secures the small ring in a ring fastening channel of a latch assembly base. A latch slide and safety lever of the latch assembly are attached to the base and manipulable between a released position and a fastened position. When the latch assembly is configured in the fastened position, the latch slide covers the ring fastening channel. When the latch assembly is configured in the released position, the latch slide covers the safety lever.

DETAILED DESCRIPTION

Figure 1:
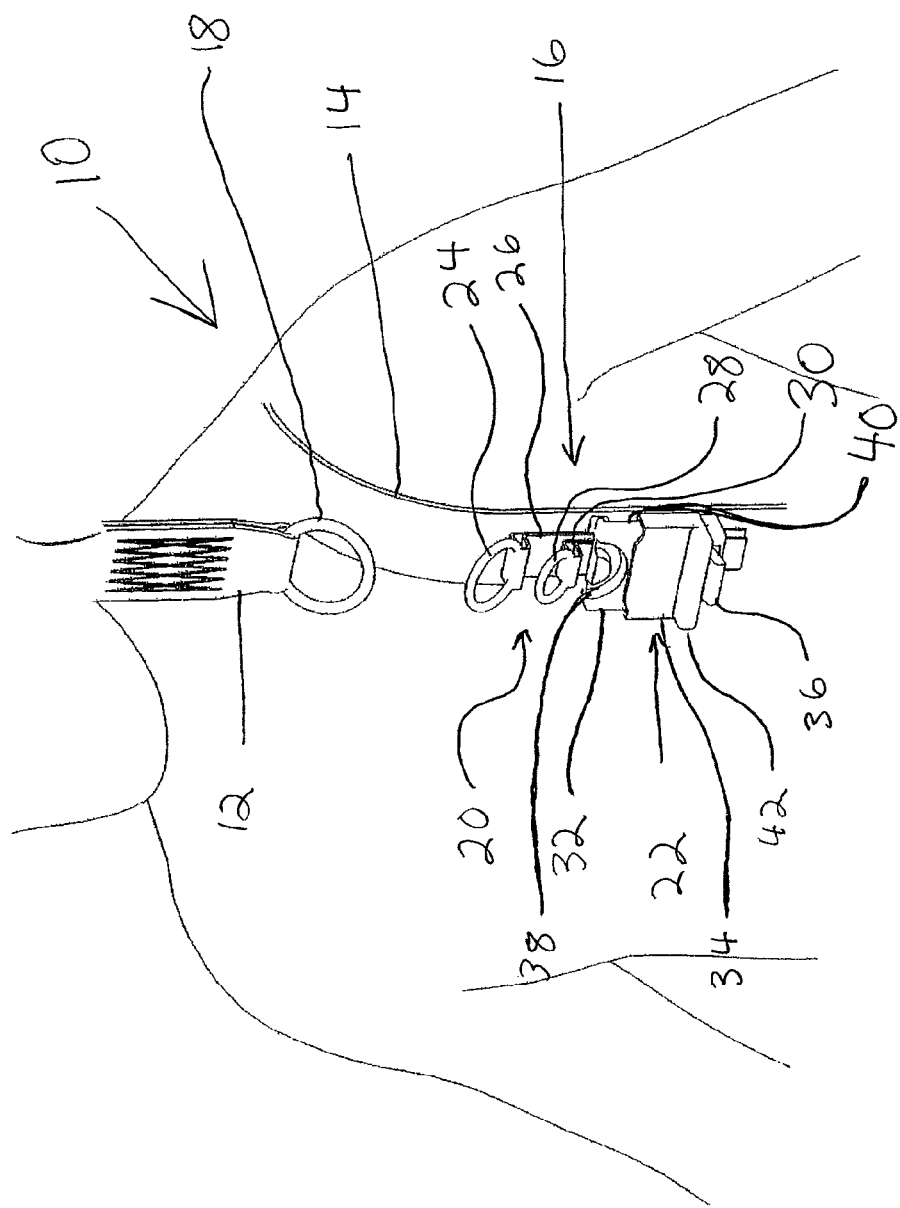
FIG. 1 is a perspective view of a parachute canopy release including a parachute riser (partially illustrated) and a harness strap (partially illustrated) as worn by a parachutist (partial illustration in silhouette) and configured in a released position.

Though the description generally refers to an apparatus for attaching and releasing a parachute to a harness strap, the three-ring configuration disclosed herein may be used in any application where two lengths of material must be releasably affixed.

Referring to the drawings, the parachute canopy release mechanism 10 generally includes a parachute riser 12, a harness strap 14, and a connector assembly 16. The riser 12 is preferably constructed from nylon webbing, and provides an attachment point between a parachute (not shown) and the harness strap 14. In the embodiment illustrated in the figures, the parachute riser terminates in a riser ring 18. The riser ring 18 has an outer and an inner diameter. The riser ring 18 may be attached to the riser using any of the methods known in the art, for example, looping the end of the riser around the ring and securing the end of the riser in a loop via a stitched connection, as illustrated in the figures.

The connector assembly 16 further comprises a ring assembly 20 and a latch assembly 22. A middle ring 24 of the ring assembly 20 provides a first attachment point between the riser 12 and the connector assembly 16. The middle ring 24 has an outer and an inner diameter. The outer diameter of the middle ring 24 is smaller than the inner diameter of the riser ring 18 so that the middle ring 24 may pass through the riser ring 18. A middle ring securing strap 26 loops around the middle ring 24 and secures the middle ring 24 to the harness strap 14.

A small ring 28 provides a second attachment point between the riser 12 and connector assembly 16. The small ring 28 has an outer and an inner diameter. The outer diameter of the small ring 28 is smaller than the inner diameter of the middle ring 24 so that the small ring 28 may pass through the middle ring 24. A small ring securing strap 30 loops around the small ring 28 and secures the small ring 28 to the harness strap 14. The small ring securing strap 30 and middle ring securing strap 26 are secured to the harness strap 14 so as to position the small ring 24 adjacent the middle ring 28. In the embodiments depicted in the figures, the middle ring securing strap 26 is stitched to the exterior surface of the harness strap 14. The small ring securing strap 30 is stitched to the surface of the middle ring securing strap 26 at a point intermediate the middle ring 24 and the end of the middle ring securing strap 26.

The riser ring 18, middle ring 24, and small ring 28 may be constructed of aluminum, titanium, steel, or any high strength rigid material capable of maintaining its original form when repeatedly subjected to high tension forces.

Figure 2:
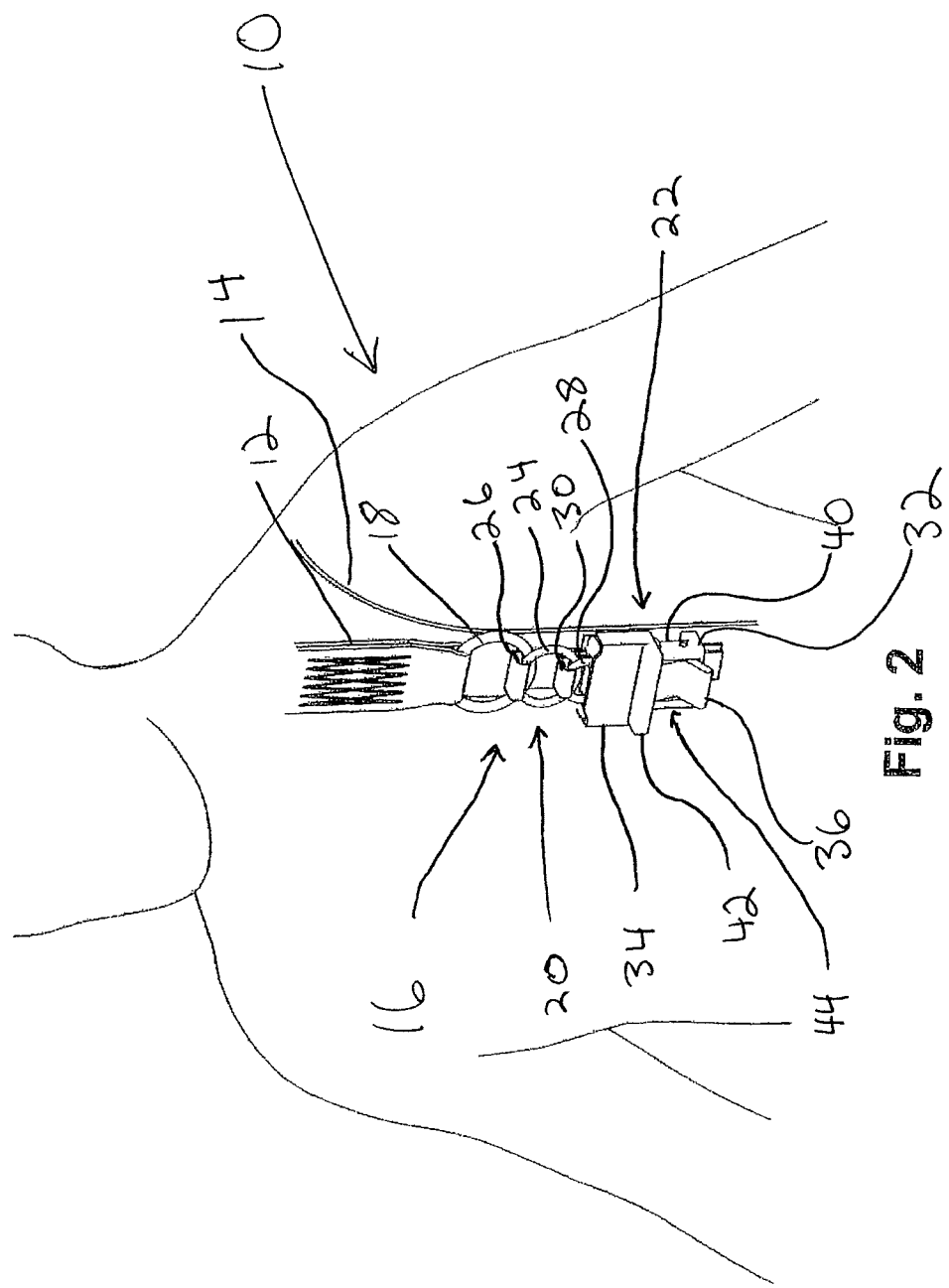
FIG. 2 is a perspective view of a parachute canopy release including a parachute riser (partially illustrated) and a harness strap (partially illustrated) as worn by a parachutist (partial illustration in silhouette) and configured in a fastened position.

The latch assembly 22 is secured to the harness strap 14 adjacent the small ring 28 and includes base 32, latch slide 34, and safety lever 36. The base 32 has an elongate body and may be made of the same material as the rings. At the end adjacent the small ring 28, a ring fastening channel 38 is formed in the base 32. The ring fastening channel 38 is sized to receive the small ring 28. FIG. 2 shows the ring fastening channel 38 embodied as an arcuate groove defined in the base 32.

The latch slide 34, which in a preferred embodiment is spring-loaded, has an exterior surface and an interior surface. The latch slide 34 engages retention ledges 40 configured along the base 32 at a cavity defined between the base 32 and the surface of the harness strap 14. The latch slide 34 is manipulable between a fastened and released position by moving the slide 34 along the retention ledges 40. In the fastened position, the slide 34 covers the ring fastening channel 38 to thereby capture the small ring 28, while in the released position the slide covers the safety lever. The embodiment of the latch slide 34 illustrated in the figures also shows the slide 34 having a fastening ledge 42 projecting from the exterior surface. The fastening ledge 42 improves the manipulability of the latch slide 34, allowing a parachutist to efficiently fasten or release the connector assembly 16 with one hand.

The safety lever 36 is installed in the base 32 at the end opposite the ring fastening channel 38. In the embodiments depicted in the figures, the safety lever 36 is generally L-shaped and is pivotable around an attachment axis formed in the base 32. The safety lever 36 is spring loaded, and received in a safety lever cavity 44 when the latch assembly 22 is configured in the released position. When in the released position the interior surface of the latch slide 34 prevents the safety lever spring (not shown) from pivoting the safety lever 36 about the attachment axis.

The three-ring parachute canopy release is fastened by sequentially securing the rings within one another. The riser ring 18 is secured by the middle ring securing strap 26 after inserting the middle ring 24 within the inner diameter of the riser ring 18. The middle ring 24 is secured by the small ring securing strap 30 after inserting the small ring 28 within the inner diameter of the middle ring 24. The small ring 28 is then secured in the latch assembly 22 by inserting the small ring 28 in the ring fastening channel 38.

Once the small ring 28 is secured in the ring fastening channel 38, the latch slide 34 is maneuvered into the fastened position via the fastening ledge 42, so that the latch slide 34 covers the fastening channel 38. When the latch slide 34 is positioned thus, the interior surface of the slide 34 captures the small ring 28 within the ring fastening channel 38. After the latch slide 34 is maneuvered over the fastening channel 38, the safety lever spring (not shown) pivots the safety lever 36 about the attachment axis in the base 32. Once pivoted about the attachment axis, the safety lever 36 engages the fastening ledge 42. The safety lever 36, safety lever spring (not shown), and the attachment axis function to prevent the latch slide 34 from returning to the released position.

The three-ring parachute canopy release is maneuvered into the released position by first pivoting the safety lever 36 about the attachment axis. Once the safety lever 36 is pivoted into the safety lever cavity 44, the latch slide 34 is maneuvered over the safety lever 36. Though release of the latch assembly 22 is described as a two-step process, a parachutist may release the latch assembly with one hand by pinching or forcing together the safety lever 36 and the fastening ledge 42.

Once the latch assembly is maneuvered into the released position the ring assembly 20 is quickly disengaged in cascade fashion. First the small ring 28 is removed from the ring fastening channel. Next the small ring securing strap 30 and small ring 28 are removed from the inner diameter of the middle ring 24. Subsequently, the middle ring securing strap 26 and middle ring are removed from the inner diameter of the riser ring 18. Once the middle ring 24 is removed from the inner diameter of the riser ring 18, the parachute is effectively released from the harness 14.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A parachute canopy release for use with a parachute riser having a terminal end connected to a riser ring, said canopy release comprising:
    a harness strap having a connector assembly comprising a ring assembly and a latch assembly, said ring assembly having a middle ring and a small ring secured to said harness at middle and small ring securing straps, respectively, wherein said middle ring and said small ring each has an outer diameter, said outer diameter of said middle ring sized to be smaller than said inner diameter of said riser ring, and said outer diameter of said small ring sized to be smaller than said inner diameter of said middle ring, said latch assembly having a base and a latch slide engaging said base, wherein said base defines a ring fastening channel sized to receive said small ring and retain said small ring intermediate said base and said latch slide;
    wherein said middle ring is inserted through an inner diameter of said riser ring such that said middle ring securing strap secures said riser ring, said small ring is inserted through an inner diameter of said middle ring such that said small ring securing strap secures said middle ring, and said latch assembly is manipulated such that said latch slide retains said small ring intermediate said base and an interior surface of said latch slide when said parachute riser is releasably connected to said harness strap.

2. The parachute canopy release of claim 1, wherein said ring fastening channel is an arcuate groove.

3. The parachute canopy release of claim 1, wherein said latch assembly is manipulable between a released position in which said latch slide covers a safety lever and a fastened position wherein said latch slide covers said ring fastening channel, wherein when said parachute canopy release is in a fastened position, said riser ring is secured by said middle ring securing strap after said middle ring is inserted through said inner diameter of said riser ring, said middle ring is secured by said small ring securing strap after said small ring is inserted through said inner diameter of said middle ring, and said small ring is captured in said ring fastening channel after said latch slide is maneuvered over said base, and said safety lever is engaged preventing said latch slide from returning to said released position.

4. The parachute canopy release of claim 3, wherein said base defines a safety lever cavity, said safety lever is pivotable about an attachment axis located at an end of said base opposite said safety channel, and said safety lever is received in said safety cavity in said released position.

5. The parachute canopy release of claim 4, wherein a safety lever spring pivotally biases said safety lever away from said base about said attachment axis such that said safety lever engages said latch slide when said latch slide is manipulated from said released position to said fastened position.

6. The parachute canopy release of claim 3, wherein said latch slide has a spring which biases said latch slide towards said released position.

7. The parachute canopy release of claim 1, wherein a fastening ledge projects perpendicularly from said latch slide.

8. A parachute canopy release comprising:
    a harness strap;
    a parachute riser having a terminal end connected to a riser ring, said riser ring having an inner and outer diameter; and
    a connector assembly comprising:
        a ring assembly having a middle ring secured to said harness strap via a middle ring securing strap, said middle ring having an inner and outer diameter, said outer diameter of said middle ring sized to be smaller than said inner diameter of said riser ring, a small ring secured to said harness strap via a small ring securing strap, said small ring having an inner and outer diameter, said outer diameter of said small ring sized to be smaller than said inner diameter of said middle ring; and
        a latch assembly having a base, a latch slide engaging said base, and a safety lever, said base defining a ring fastening channel sized to receive said small ring, and said latch slide is manipulable between a released position in which said slide covers said safety lever, and a fastened position wherein said slide covers said channel;

wherein when said parachute canopy release is in a fastened position, said riser ring is secured by said middle ring securing strap after said middle ring is inserted through said inner diameter of said riser ring, said middle ring is secured by said small ring securing strap after said small ring is inserted through said inner diameter of said middle ring, and said small ring is captured in said ring fastening channel after said latch slide is maneuvered over said fastening channel, and said safety lever is engaged preventing said latch slide from returning to said released position.

9. The parachute canopy release of claim 8, wherein said ring fastening channel is arcuately shaped.

10. The parachute canopy release of claim 8, wherein said base defines a safety lever cavity, said safety lever is pivotable about an attachment axis located at an end of said base opposite said safety channel, and said safety lever is received in said safety cavity in said released position.

11. The parachute canopy release of claim 10, wherein a safety lever spring pivotally biases said safety lever away from said base about said attachment axis such that said safety lever engages said latch slide when said latch slide is manipulated from said released position to said fastened position.

12. The parachute canopy release of claim 8, wherein a latch slide spring biases said latch slide towards said released position.

13. The parachute canopy release of claim 8, wherein a fastening ledge projects perpendicularly from said latch slide.

14. A method of reversibly attaching a parachute canopy having a riser to a harness comprising:

providing a connector assembly attached to said harness, said connector assembly comprising a ring assembly having a middle ring secured to said harness via a middle ring securing strap and a small ring secured to said harness via a small ring securing strap, and a latch assembly having a base, a latch slide, and a safety lever;

inserting said middle ring through an inner diameter of a riser ring attached to said riser such that a middle ring securing strap secures said riser ring;

inserting said small ring through an inner diameter of said middle ring such that said small ring securing strap secures said middle ring;

reversibly manipulating said latch slide into a fastened position such that said small ring is retained intermediate said base and an interior surface of said latch slide.

\* \* \* \* \*